United States Patent
Seebacher et al.

(10) Patent No.: US 7,083,029 B2
(45) Date of Patent: Aug. 1, 2006

(54) POWER TRANSFER APPARATUS WITH FLUID COUPLING

(75) Inventors: Roland Seebacher, Neuried (DE);
Helmut Muller, Buhlertal (DE); Dieter Otto, Achern-Oberachern (DE); Steven Olsen, Buhl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 118 days.

(21) Appl. No.: 10/943,637

(22) Filed: Sep. 17, 2004

(65) Prior Publication Data

US 2005/0042106 A1     Feb. 24, 2005

Related U.S. Application Data

(63) Continuation of application No. 08/135,059, filed on Oct. 12, 1993, now abandoned.

(30) Foreign Application Priority Data

Oct. 12, 1992  (DE) ............................. P 42 34 304

(51) Int. Cl.
*F16D 33/18*  (2006.01)
(52) U.S. Cl. .................... 192/3.29; 192/212
(58) Field of Classification Search .............. 192/3.28, 192/3.29, 3.33, 106.2, 212; 464/67, 68
See application file for complete search history.

(56) References Cited

U.S. PATENT DOCUMENTS

| 4,240,532 A | 12/1980 | Blomquist |
| 4,722,715 A | 2/1988 | Billet et al. |
| 4,867,290 A | 9/1989 | MacDonald et al. |
| 4,969,544 A | 11/1990 | Fujimoto |
| 5,080,215 A | 1/1992 | Forster et al. |
| 5,150,777 A | 9/1992 | Friedmann |
| 5,203,835 A | 4/1993 | Kohno et al. |
| 5,224,576 A | 7/1993 | Fujimoto |
| 5,377,796 A | 1/1995 | Friedmann et al. |

FOREIGN PATENT DOCUMENTS

| JP | 54-145860 | 11/1979 |
| JP | 05-794164 | 6/1982 |
| JP | 05-231495 | 9/1993 |

*Primary Examiner*—Saul Rodriguez
(74) *Attorney, Agent, or Firm*—Darby & Darby

(57) ABSTRACT

Apparatus for transmitting torque between the output shaft of the engine and the input shaft of the transmission in a motor vehicle has a fluid coupling with a housing secured to the output shaft and containing an impeller, a runner and, if necessary, a guide wheel. The runner is connected to a hub on the input shaft by a carrier for a torsionally elastic damper having coil springs which receive torque from the housing. The damper is in series with a clutch which can be operated to bypass the fluid coupling.

18 Claims, 4 Drawing Sheets

POWER TRANSFER APPARATUS WITH FLUID COUPLING

This application is a continuation of application Ser. No. 08/135,059, filed Oct. 12, 1993 now abandoned. This prior application is hereby incorporated herein by reference, in its entirety.

BACKGROUND OF THE INVENTION

The present invention relates to improvements in power transmitting apparatus, and more particularly to improvements in power transmitting apparatus of the type employing fluid couplings such as Föttinger couplings, hydrodynamic torque converters or analogous machines. Still more particularly, the invention relates to improvements in apparatus wherein a rotary housing can be driven by the output device of a prime mover (e.g., by the crankshaft of a combustion engine in a motor vehicle) to transmit torque to an input device (e.g., to the input shaft of a variable speed transmission in the power train between the engine and one or more wheels of a motor vehicle). As a rule, the housing in an apparatus of the above outlined character confines and transmits torque to an impeller, and the input device receives torque from a runner which is also installed in the housing. A guide wheel is or can be provided in the housing to operate between the impeller and the runner, and at least one torsionally elastic damper is or can be installed in the path for the flow of power between the housing and the input device, e.g., between the housing and a hub which can be used to drive the input shaft of the aforementioned transmission. In many instances, the damper comprises one or more energy storing elements and the apparatus can also comprise a so-called bypass clutch which serves to establish a direct connection between the housing and the output device, i.e., between the output device of the prime mover and the driven unit (such as a transmission) and to thus bypass the fluid coupling.

OBJECTS OF THE INVENTION

An object of the invention is to provide an improved power or force transmitting apparatus, and more particularly to improve the damping of fluctuations of transmitted power.

Another object of the invention is to provide an apparatus wherein the power input and output devices can move relative to each other through great distances.

A further object of the invention is to provide an apparatus wherein the rotary power input and output devices can turn relative to each other through large angles.

An additional object of the invention is to provide a power transmitting apparatus which employs a bypass clutch and wherein the clutch is designed to transmit pronounced or small torques.

Still another object of the invention is to provide a novel and improved bypass clutch for use in the above outlined power transmitting apparatus and to construct and assemble the clutch in such a way that its input and output components can be moved into strong torque transmitting engagement with one another.

A further object of the invention is to provide a simple, compact and inexpensive power transmitting apparatus which can be utilized as a superior substitute for heretofore known apparatus in motor vehicles and elsewhere.

Another object of the invention is to provide a power transmitting apparatus wherein at least some of the component parts are not subject to extensive wear so that the apparatus can be used for long periods of time without necessitating inspection, repair and/or even partial dismantling.

An additional object of the invention is to provide an apparatus which can be assembled within a short interval of time and which is constructed and assembled in such a way that the parts (e.g., springs) which are repeatedly subjected to stresses of varying magnitude can stand such stresses for long periods of time.

Still another object of the invention is to provide an apparatus whose useful life is longer than that of conventional apparatus and wherein the component parts are constructed, configurated and assembled in such a way that they, too, can stand long periods of continuous or intermittent use.

A further object of the invention is to provide the above outlined power transmitting apparatus with a compact bypass clutch.

Another object of the invention is to provide an apparatus wherein the bypass clutch can be engaged for transmission of a wide range of forces between the input and output devices of the apparatus.

An additional object of the invention is to provide a power transmitting apparatus whose energy requirements are lower than those of heretofore known apparatus employing a bypass clutch and/or a fluid coupling.

Still another object of the invention is to provide a power transmitting apparatus which enhances the comfort to the occupant or occupants of a conveyance within a wide range of power transmission rates between the engine and the wheel or wheels or other driven part(s) of the conveyance.

A further object of the invention is to provide the apparatus with a bypass clutch which can be engaged at relatively low rotational speeds.

Another object of the invention is to provide the above outlined apparatus with novel and improved means for damping fluctuations of torque transmission between the rotary input and output devices of the apparatus.

An additional object of the invention is to provide an apparatus wherein the characteristic frequency of certain parts is transferred into a range which is different from that in a conventional apparatus and is not affected when the machine employing the improved apparatus operates normally.

Still another object of the invention is to provide a novel and improved method of transmitting power between the engine and the differential of a motor vehicle.

A further object of the invention is to provide a novel and improved method of engaging and disengaging the bypass clutch in the above outlined power transmitting apparatus.

Another object of the invention is to provide a motor vehicle which embodies the above outlined apparatus.

An additional object of the invention is to provide a novel and improved power train between the engine and one or more wheels of a motor vehicle.

Still another object of the invention is to provide a power transmitting apparatus which can employ any one of a plurality of different fluid couplings.

A further object of the invention is to provide a novel and improved combination of a fluid coupling, one or more dampers and a bypass clutch for use in the above outlined apparatus.

Another object of the invention is to provide a novel and improved housing for a fluid coupling and a bypass clutch which are used in the above outlined apparatus.

An additional object of the invention is to provide a power transmitting apparatus which can be put to use in numerous types of motor vehicles but is also capable of being used to

SUMMARY OF THE INVENTION

One feature of the present invention resides in the provision of a power transmitting apparatus which comprises a fluid coupling (such as a Föttinger coupling or a hydrodynamic torque converter) including at least one housing having an axis of rotation and being connectable with a rotary output device (such as the crankshaft of a combustion engine in a motor vehicle), at least one impeller which is disposed in and is driven by the at least one housing, and at least one runner also disposed in the at least one housing and being connectable with a rotary input device (e.g., a shaft or another rotary input component of a variable speed transmission in a motor vehicle). The improved apparatus further comprises damper means comprising at least one torsionally elastic damper including means for transmitting power between the at least one housing and the input device, and the power transmitting means includes at least one energy storing element acting in the circumferential direction of the at least one impeller intermediate the at least one runner and the input device. The at least one energy storing element is spaced apart from and is disposed radially outwardly of the axis of the at least one housing so that it is located radially outwardly of the center of the impeller. The fluid coupling can further include at least one guide wheel which is installed between the at least one impeller and the at least one runner.

The at least one housing can include a wall which is adjacent the output device, and the power transmitting means is or can be disposed (at least in part) between such wall and the at least one runner, as seen in the direction of the axis of the at least one housing.

At least a portion of the damper means can be disposed between the wall of the at least one housing and the at least one runner (again as seen in the direction of the axis of the at least one housing). The wall is preferably adjacent the output device, and the aforementioned portion of the damper means includes the at least one energy storing element.

The damper means is preferably designed in such a way that its spring rate or spring gradient is between 2 and 20 Nm/°, particularly between 5 and 15 Nm/°.

The at least one energy storing element of the power transmitting means forming part of the at least one damper preferably extends circumferentially of the at least one housing, particularly along an arc of between 75 and 175°. The power transmitting means can include a plurality of energy storing elements (such as coil springs) each of which can extend along an arc of between 75 and 175°.

The at least one energy storing element (or each of a plurality of energy storing elements) can constitute an arcuate spring, particularly a preformed arcuate spring having a predetermined curvature. Each such preformed spring can constitute a coil spring having a predetermined radius of curvature. As used herein, the term "preformed" is intended to denote that the radius of curvature of each such preformed spring is not changed at all, or does not require substantial changes, for the purposes of installing it in the at least one housing of the fluid coupling forming part of the improved apparatus. In other words, the predetermined radius of curvature can be imparted in the plant where the at least one damper is assembled and the radius need not be changed (or is changed only slightly or negligibly) as a result of and upon completed insertion in the at least one housing and/or in any other part or parts of the at least one damper.

The at least one energy storing element of the at least one damper includes a radially outer portion which is remotest from the axis of the at least one housing, and the apparatus can further comprise suitable wear reducing means adjacent the at least the radially outer portion of the at least one energy storing element. At least a part of the radially outer portion of the at least one energy storing element can abut the wear reducing means in response to rotation of the at least one housing, i.e., when the at least one energy storing element is acted upon by centrifugal force. The wear reducing means can include at least one separately produced component which is installed in the at least one housing; such component can include a one-piece arcuate trough for each energy storing element, a one-piece arcuate trough for two or more neighboring energy storing elements, or a composite trough for each energy storing element or for two or more neighboring energy storing elements.

The at least one damper preferably further comprises a carrier for the at least one energy storing element, and the carrier can include a confining portion which is radially outwardly adjacent the at least one energy storing element. The carrier is rotatable with the at least one runner. To this end, the apparatus can further comprise means for non-rotatably connecting the carrier with the at least one runner. The carrier can further comprise a second portion which is disposed radially inwardly of the confining portion and is non-rotatably connected with the at least one runner. Alternatively, the latter can include a radially outer portion which is non-rotatably associated with the confining portion of the carrier.

The at least one damper includes an output member, and the apparatus can further comprise an output element (e.g., a hub) which serves to transmit torque to the input device and is directly or indirectly connected with the output member of the at least one damper so that the output element of the apparatus and the output member of the at least one damper share all angular movements. The damper means of such apparatus can further comprise a second damper which is disposed radially outwardly of the at least one damper and has an output member constituting an input member of the at least one damper. Such apparatus can further comprise an output element and a shaft non-rotatably connected with the output element. The at least one damper is supported by the output element.

The apparatus can comprise means for at least indirectly connecting the at least one runner with the power transmitting means, and such connecting means can include a welded joint.

The apparatus can further comprise a bypass clutch which is installed in series with the damper means. The bypass clutch includes an output component which is non-rotatably connected with the input member of the at least one damper and is movable in the direction of the axis of the at least one housing. The output component can perform such movement relative to the input member of the at least one damper.

The bypass clutch can be provided with a friction surface disposed at a predetermined radial distance from the aforementioned axis. The at least one damper is then disposed at a second radial distance from the axis, and such second radial distance can match or at least approximate the predetermined radial distance.

The output component of the bypass clutch can be disposed between the at least one damper and the aforementioned wall of the at least one housing (as seen in the direction of the axis of the at least one housing). As already mentioned above, the wall of the at least one housing is or can be installed adjacent the output device and can be directly or indirectly connected to such output device (e.g., to the crankshaft of an internal combustion engine).

The rotary output component of the bypass clutch can comprise a reciprocable piston or plunger. The output component is movable in the direction of the axis of the at least one housing, and a portion of such component can sealingly engage a portion of the input device. The arrangement can be such that the output component of the bypass clutch is movable in the direction of as well as about the axis of the at least one housing, and such apparatus can comprise means for form-lockingly connecting the output component of the bypass clutch with the input member of the at least one damper so that the input member shares the rotary movements of the output component. The connecting means can comprise mating teeth provided on the output component of the bypass clutch and on the input member of the at least one damper; such teeth preferably extend at least substantially radially of the axis of the at least one housing. Alternatively, the connecting means including mating teeth on the output component of the bypass clutch and on the input member of the at least one damper can be replaced with connecting means employing one or more leaf springs which are constructed and mounted to permit movements of the output component and input member relative to each other in the direction of the aforementioned axis but prevent angular movements of the output component and the input member relative to each other about such axis.

Another feature of the invention resides in the provision of a power or torque transmitting apparatus which comprises a fluid coupling including at least one housing having an axis of rotation and being connectable with a rotary output device, at least one impeller which is disposed in and is driven by the at least one housing, and at least one runner disposed in the at least one housing and being connectable with a rotary input device. The apparatus further comprises an output element (e.g., including or constituting a hub which is mounted on or forms part of the aforementioned input device), and at least one torsionally elastic damper in a power train between the at least one housing and the output element. The at least one damper includes at least one energy storing element (such as an arcuate coil spring) which acts in a circumferential direction of the at least one housing and is disposed radially outwardly of the axis between the at least one runner and the output element. The apparatus further comprises means for stressing the at least one damper, and such stressing means is connected with the runner for joint movement about and along the axis of rotation of the at least one housing. The runner is movable relative to the output element in the direction of the axis.

The fluid coupling can further comprise at least one guide wheel between the at least one impeller and the at least one runner.

The apparatus can further comprise means for at least indirectly mounting the stressing means on the output element. The means for indirectly mounting can comprise an intermediate member which surrounds at least a portion of the hub of the output element. Such intermediate member can comprise means for limiting the extent of movability of the at least one runner in at least one direction axially of the at least one housing. The intermediate member can be made, at least in part, of a plastic material.

The apparatus can further comprise a carrier which connects the stressing means with the at least one runner. In accordance with a presently preferred embodiment, the carrier has a substantially L-shaped cross-sectional outline and overlies the stressing means as seen in the direction of the axis of the at least one housing. Such apparatus can further comprise means for securing the carrier to the at least one runner, and such securing means can comprise a welded joint. The carrier can constitute an output component of a bypass coupling, preferably a coupling which is installed in series with the at least one damper. To this end, the carrier can be provided with at least one friction lining.

A further feature of the present invention resides in the provision of a power transmitting apparatus comprising a fluid coupling (such as a Föttinger coupling or a hydrodynamic torque converter) which includes at least one housing having an axis of rotation and being connectable with a rotary output device (such as the crankshaft of an internal combustion engine or another engine or prime mover in a motor vehicle), at least one impeller which is disposed in and is driven by the at least one housing, and at least one runner which is disposed in the at least one housing and is connectable with a rotary input device (e.g., with a shaft of a variable-speed transmission between the engine or another prime mover and one or more wheels of a motor vehicle). The improved apparatus further comprises a rotary output element (e.g., a hub which can be non-rotatably connected with the shaft of the transmission), and damper means including at least two torsionally elastic dampers in a power train between the at least one housing and the output element. Each of the at least two dampers includes at least one energy storing element (such as an arcuate coil spring) acting in a circumferential direction of the at least one housing. The at least one energy storing element of one of the at least two dampers is disposed in a power train between the at least one runner and the output element and the at least one energy storing element of the other of the at least two dampers is disposed in a power train between the at least one housing and the at least one runner.

The fluid coupling can further comprise at least one guide wheel which is installed in the at least one housing between the at least one impeller and the at least one runner.

The at least one energy storing element of the other damper can be disposed at a first radial distance from the axis of the at least one housing, and the at least one energy storing element of the one damper can be disposed at a lesser second radial distance from the axis.

The apparatus can further comprise a clutch which can be engaged to bypass the fluid coupling and has at least one friction surface (e.g., on a friction lining) which is disposed between the energy storing elements of the at least two dampers (as seen radially of the axis of the at least one housing). The bypass clutch is preferably designed to connect an output member of one of the at least two dampers with an input member of the other of the at least two dampers, preferably to connect the output member of the damper having at least one energy storing element at a greater radial distance from the axis of the at least one housing with the input member of the damper having at least one energy storing element disposed at a lesser radial distance from such axis.

The input member of one of the at least two dampers can form part of the at least one runner, and the input member of the other of the at least two dampers can form part of the at least one housing. The arrangement is preferably such that the input member forming part of the runner constitutes a component of the damper having at least one energy storing element disposed at a lesser radial distance from the axis of the at least one housing.

The apparatus can further comprise means for non-rotatably connecting the output member of one of the at least two dampers with the output element of the apparatus.

The output element of the apparatus can comprise means for centering the at least one runner. Furthermore, the apparatus can comprise means (e.g., a part of the output element or a part on the output element) for centering the plunger of the bypass clutch. Such plunger can resemble or constitute a disc extending substantially radially of the axis of the at least one housing. The centering mean for the plunger can comprise a substantially sleeve-like portion which at least partially surrounds the output element, and such apparatus can further comprise at least one seal which is disposed between a radially inner portion of the plunger and the substantially sleeve-like portion at least partially surrounding the output element. The radially inner portion of the substantially disc-shaped plunger forming part of the bypass clutch can include a sleeve which surrounds the substantially sleeve-like portion of the centering means. The at least one seal can include one or more O-rings between the sleeve of the plunger and the substantially sleeve-like portion of the centering means.

The output member of one of the at least two dampers can be centered by and is preferably movable relative to the output member of the other of the at least two dampers in the direction of the axis of the at least one housing. The centered output member is preferably that which forms part of the damper having at least one energy storing element disposed at a greater radial distance from the axis.

The substantially disc-shaped plunger of the aforementioned bypass clutch can be non-rotatably connected with the input member of one of the at least two dampers, preferably with the input member of the damper having at least one energy storing element nearer to the axis of the at least one housing.

As already mentioned above, the preferably substantially disc-shaped plunger of the bypass clutch can be centered on the output element of the apparatus. The means for centering the plunger is or can be non-rotatably connected to the plunger, preferably with a certain amount of play.

The novel features which are considered as characteristic of the invention are set forth in particular in the appended claims. The improved power transmitting apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
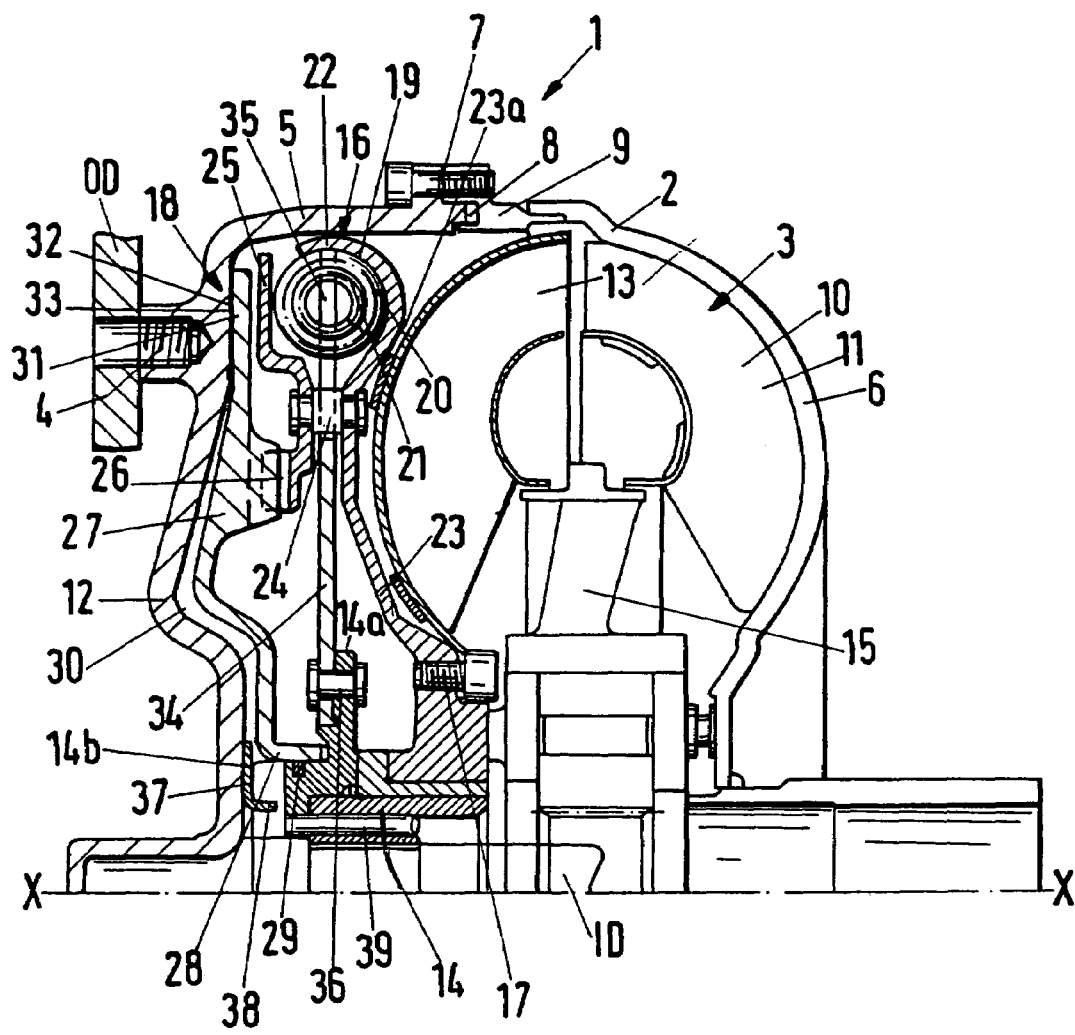
FIG. 1 is a fragmentary partly schematic axial sectional view of a power transmitting apparatus which embodies one form of the invention and employs damper means having a single damper.

Referring first to FIG. 1, there is shown a portion of a power transmitting apparatus 1 which can be utilized in a motor vehicle to transmit torque from a rotary output device OD (e.g., a crankshaft or another shaft receiving torque from the engine of a motor vehicle) and a rotary input device ID (e.g., the input shaft of a variable-speed transmission in the power train between the engine and one or more wheels of a vehicle). The apparatus 1 comprises a rotary housing 2 for a hydrodynamic torque converter 3. The axis of rotation of the housing 2 is shown at X—X; this axis coincides with the axes of the devices OD and ID, and the housing 2 has a substantially radially extending wall 12 which is adjacent the engine (the latter is assumed to be located to the left of FIG. 1) and is separably affixed to the output device OD at a radial distance from the axis X—X. FIG. 1 merely shows a single tapped blind bore 4 for reception of the externally threaded shank of a suitable fastener (e.g., a bolt) which forms part of the means for separably affixing the housing 2 to the output device OD of the engine. It is also possible to employ a disc-shaped torque transmitting part which is interposed between the output device OD and the wall 12; such torque transmitting part can be separably affixed to the wall 12 (as at 4) and to the output device OD in the region of the axis X—X or radially outwardly of such axis.

The wall 12 constitutes one portion of one (5) of two main sections 5 and 6 of the housing 2. The section 5 is substantially tubular (e.g., cylindrical) and its other or main portion is located radially outwardly of the axis X—X; the wall 12 extends radially inwardly from that end of the main portion of the section 5 which is nearest the engine and to the output device OD. The section 6 is coupled to and receives torque from the section 5, and the latter is located between the section 6 and the output device OD. The means for rigidly connecting the neighboring end portions of the housing sections 5 and 6 to each other comprises a set of substantially axially parallel threaded fasteners 7 in the form of bolts or screws which deform a ring-shaped seal 8 serving to prevent escape of fluid from the housing 2 into the surrounding atmosphere at the junction of the sections 5, 6. The seal 8 includes a substantially cylindrical sleeve-like portion 9 which is rigidly secured to or is of one piece with one of the sections 5, 6, e.g., with the section 6.

The torque converter 3 in the housing 2 comprises an impeller 10 which, in the embodiment of FIG. 1, is constituted by a portion of the housing section 6. More specifically, the impeller 10 includes a radially outer portion or shell which is of one piece with the section 6 of the housing 2 and carries a set of customary vanes or blades 11. Such vanes can be made of a metallic sheet material. The torque converter 3 further comprises a runner 13 which is disposed between the impeller 10 and the wall 12 (as seen in the direction of the axis X—X). The runner 13 is rotatably mounted on a hub 14 which has internal splines extending in parallelism with the axis X—X and non-rotatably engaging the input device ID. The hub 14 can be said to form a separable part of the input device ID and to constitute the output element of the apparatus 1.

The torque converter 3 further comprises an optional guide wheel 15 which is installed between the radially inner portions of the impeller 10 and runner 13.

The space which is surrounded by the sections 5 and 6 of the housing 2 further confines damper means here shown as including a single torsionally elastic damper 16 serving to transmit torque between a driving part (in the apparatus 1 of FIG. 1, such driving part is the runner 13) and a driven part (the driven part in the apparatus 1 of FIG. 1 is the hub 14). The damper 16 includes a substantially radially extending carrier 23 which is fixedly secured to the runner 13 by threaded fasteners 17. The damper 16 is installed in series with a so-called torque converter clutch or lockup clutch 18 (hereinafter called bypass clutch) which is also confined in the space surrounded by the sections 5, 6 of the housing 2 and can be engaged to bypass the torque converter 3.

Figure 2:
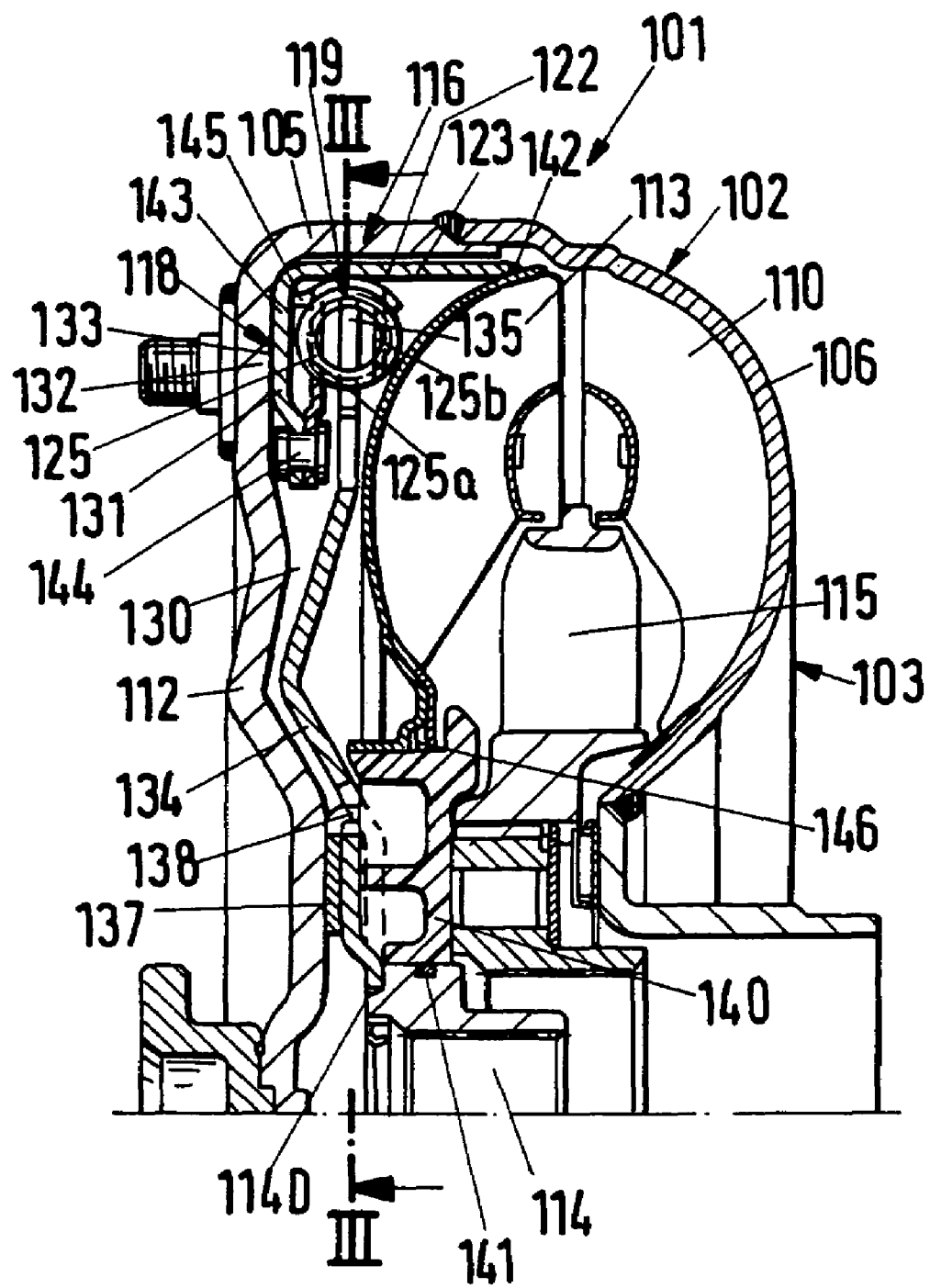
FIG. 2 is a similar fragmentary partly schematic axial sectional view of a second power transmitting apparatus.
Figure 3:
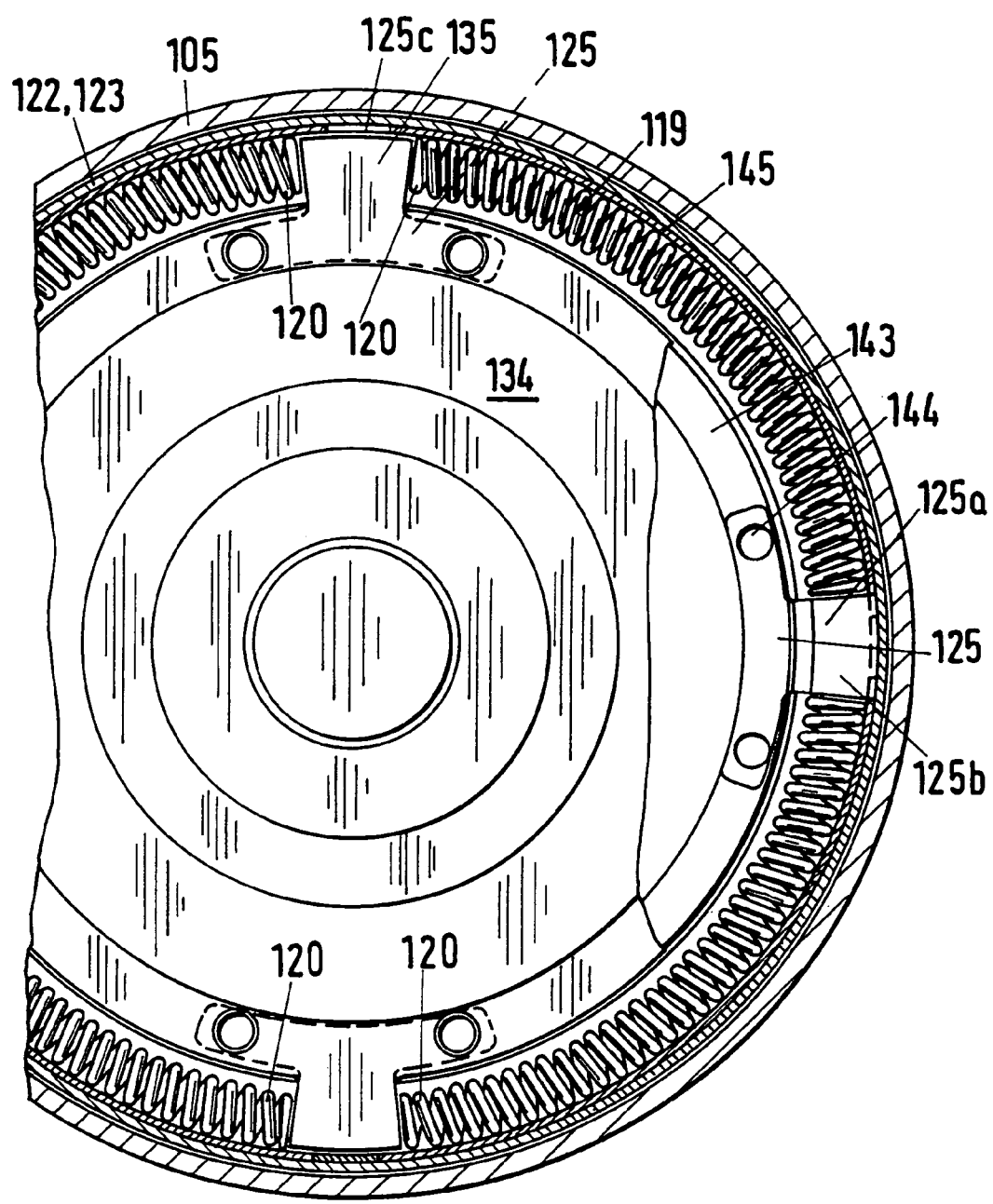
FIG. 3 is a fragmentary transverse sectional view substantially as seen in the direction of arrows from the line III—III in FIG. 2 but with certain parts omitted for the sake of clarity.

The illustrated single damper 16 comprises power transmitting means 19 including two sets of energy storing elements in the form of arcuate coil springs 20 and 21. The arrangement is such that the coils of the springs 20 surround the coils of the springs 21; more specifically, each spring 21 is inserted into one of the springs 20 but the rather substantial radial distance of the axes of all springs from the axis X—X of the housing 2 is the same. As can be seen in FIG. 3 (which illustrates certain parts of a second power transmitting apparatus 101), the coil springs of the power transmitting means can extend along elongated arcs of at least 45° but preferably (or often) much more. The coil springs 20, 21 of FIG. 1 are assumed to extend along arcs of close to 180°, i.e., the damper 16 can comprise two coil springs 20 and two coil springs 21. The power transmitting means 119 of the damper 116 in the apparatus 101 of FIGS. 2 and 3 comprises a total of four coil springs 120 each of which extends along an arc of a little less than 90°. It has been found that the damper 16 or 116 will operate quite satisfactorily if its coil spring or springs extend along an arc of between 70 or 75° and 175°.

Figure 4:
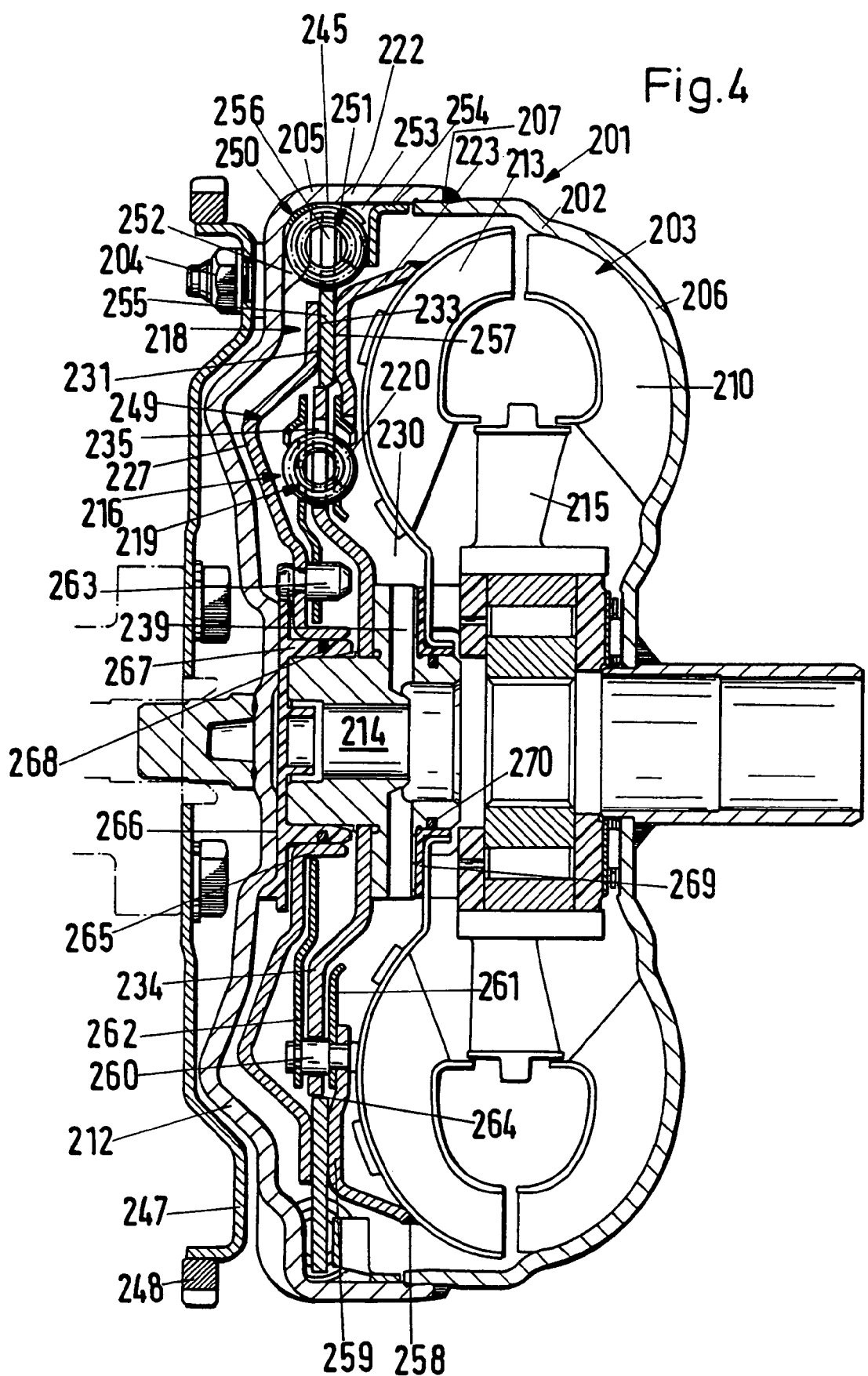
FIG. 4 is an axial sectional view of a third apparatus constituting a modification of the apparatus which are shown in FIGS. 1 and 2–3.

It is presently preferred to bend the coil springs 20, 21 or 120 of the damper 16 or 116 prior to insertion into the respective housing 2 or 102 (the same applies for the coil springs 220 and 251 in the apparatus 201 which is shown in FIG. 4). Thus, and referring back to FIG. 1, each of the coil springs 20, 21 can be shaped prior to insertion into the housing 2 so that its radius of curvature need not be changed (or must be changed relatively slightly or negligibly) for the purposes of assembling the damper 16 in the housing 2. This will be readily appreciated by referring to FIG. 3 which shows a total of four coil springs 120 each extending along an arc of somewhat less than 90°. The radii of curvature of all four springs 120 are identical and need not be changed (or need not be appreciably changed) for the purpose of installing them in the housing 102 of the power transmitting apparatus 101. Bending or shaping of coil springs forming part of the damper means in the improved apparatus 1, 101 or 201 is often desirable and advantageous because this simplifies the assembly of the apparatus and renders it possible to dispense with specially designed implements for altering the curvature of the coil springs preparatory to installation in the housing 2, 102 or 202.

The radially outer portions of the outer springs 20 bear against an adjacent arcuate trough-shaped abutment or stop 22, at least when the housing 2 is rotated by the output device OD so that the springs 20, 21 are acted upon by centrifugal force. The illustrated trough-shaped abutment 22 is an integral or a separately produced part of the aforementioned carrier 23 which is affixed to the runner 13 of the torque converter 3 by the fasteners 17. The carrier 23 is turnable about the axis of the input device ID because the runner 13 can turn relative to the hub 14. However, it is equally within the purview of the invention to modify the apparatus 1 of FIG. 1 in such a way that the illustrated substantially disc-shaped carrier 23 is replaced with a substantially annular carrier which is welded or otherwise fixedly secured to the runner 13 at a location 23a, i.e., radially outwardly of the hub 14. Such modified construction will be described with reference to FIGS. 2 and 3.

It is further advisable to provide wear reducing means (e.g., in the form of a continuous ring-shaped trough or a trough which is composed of two or more arcuate sections) between the abutment 22 and the adjacent radially outer portions of the coil springs 20. The wear reducing means in the apparatus 101 of FIGS. 2–3 is shown at 145, and the wear reducing means in the apparatus 201 of FIG. 4 is shown at 245. Analogous or identical wear reducing means can be used in the apparatus 1 of FIG. 1.

The wear reducing means can extend along the radially outer portion of each coil spring 20, and its substantially C-shaped or U-shaped cross-sectional outline ensures that at least the radially outer portions of the coil springs 20 are properly surrounded and shielded from direct contact with the abutment 22 of the carrier 23. The arrangement is preferably such that the cross-sectional outline of each trough-shaped wear reducing means at least approximates the outline of the adjacent portion of the respective coil spring. This can be readily seen in FIGS. 2 and 4. In other words, it is desirable to establish large areas of actual or possible contact between the outer sides of the coil springs and the adjacent internal surface(s) of the wear reducing means. This has been found to further reduce the likelihood of extensive wear upon the coil springs (or results in at least substantial elimination of wear) as well as to eliminate wear upon the abutment 22 of the carrier 23.

The carrier 23 includes a portion which is disposed radially inwardly of the abutment 22 and radially outwardly of the fasteners 17 and is non-rotatably secured to a substantially radially extending preferably circular member 25 by distancing elements here shown as rivets 24. The rivets 24 hold the carrier 23 and the member 25 against any axial and/or angular movement relative to each other. The member 25 includes arms or stops which engage the end convolutions of the coil springs 20, 21 forming part of the power transmitting means 19, i.e., of the damper 16. Similar arms or stops are provided on the abutment 22 of the carrier 23 opposite the arms or stops of the member 25. The arms or stops of the abutment 22 and member 25 can be obtained by providing these parts with external depressions in the form of pockets or the like. Reference may be had, for example, to the pockets 12 and 13 shown in the lower portion of FIG. 1 in commonly owned U.S. Pat. No. 5,150,777 granted Sep. 29, 1992 to Oswald Friedmann for "Apparatus for transmitting torque between the engine and the transmission of a motor vehicle". However, it is equally possible to provide separately produced (e.g., arcuate part circular) stops or arms which are welded or otherwise reliably affixed to the inner side of the abutment 22 on the carrier 23 and/or to the inner side of the member 25.

The member 25 constitutes the input member of the damper 16 and includes a portion 26 which is located radially inwardly of the distancing elements 24 and forms part of the bypass clutch 18. To this end, the portion 26 is provided with teeth which extend substantially radially of the axis X—X and mate with complementary teeth on a piston or plunger 27 also forming part of the clutch 18. The depth of mating teeth on the portion 26 of the input member 25 and on the plunger 27 is sufficient to ensure that the input member 25 and the plunger 27 are compelled to rotate as a unit but that the plunger 27 has a certain freedom of axial movement relative to the input member 25. In other words, the just described mating teeth ensure that the plunger 27 of the bypass clutch 18 can perform certain movements relative to the runner 13 (as seen in the direction of the axis X—X).

The just described teeth constitute but one form of means for establishing a non-rotatable connection between the input member 25 and the plunger 27 in such a way that the plunger has a certain freedom of axial movement relative to the member 25 and one or more other parts (such as the runner 13). For example, the radially extending teeth can be replaced by leaf springs of the type customarily employed in friction clutches to establish a non-rotatable connection between a flywheel and an axially movable pressure plate which can be caused (e.g., by a diaphragm spring) to bear against a friction lining of a clutch disc which is interposed between the pressure plate and the flywheel. Reference may be had again to FIG. 1 of the aforementioned patent to Friedmann which shows a friction clutch 4 with a housing 32 and an axially movable pressure plate 4b, the latter being axially movably but non-rotatably connected to the housing by (non-referenced) leaf springs one of which is shown in the lower portion of FIG. 1.

The piston or plunger 27 of the bypass clutch 18 comprises a radially inner portion 28 resembling a sleeve and extending axially of the housing 2 away from the wall 12, i.e., away from the engine which rotates the housing 2. The sleeve-like portion 28 is axially movably and rotatably mounted on the hub 14. An annular seal 29 is provided to prevent the flow of fluid between the sleeve-like portion 28 and the hub 14, namely the escape of fluid from an annular chamber 30 which is disposed between the wall 12 and the plunger 27 and extends radially outwardly from the hub 14. When the bypass clutch 18 is engaged, the radially outermost portion of the chamber 30 is sealed by a friction surface 31 of the plunger 27 which then bears against the adjacent friction surface 32 of the wall 12. A friction lining 33 is preferably provided on the surface 31 or 32 to bear against the surface 32 or 31 when the clutch 18 is engaged. The friction lining 33 can be bonded to the surface 31 or 32.

The coil springs 20, 21 of the power transmitting means 19 are disposed at a substantial distance from the axis X—X, i.e., they have large radii of curvature so that the housing 2 can confine a maximum of spring capacity, i.e., a large volume of resilient material. This renders it possible to cover large distances, i.e., the input member 25 and a disc-shaped output member 34 of the damper 16 can turn through surprisingly large angles relative to one another. At the same time, the spring rate or spring gradient is relatively small. For example, the extent of angular displacement between the input and output members 25, 34 of the damper 16 can be in the range of 40 and 75°, and the realizable spring gradients can be in the range of 2 and 15 Nm/°. The just mentioned data are applicable if the damper means of the power transmitting apparatus 1 comprises a single torsionally elastic damper 16, i.e., when using a single set of springs which operate in parallel. In many instances, it is advisable or even necessary to select the resistance to torsional relative angular displacement (i.e., the spring gradient) in such a way that it is between 4 and 12 Nm/°.

The disc-shaped or flange-like output member 34 of the damper 16 has radially outwardly extending arms 35 which serve to stress the springs 20 and 21 in response to angular displacement of the input member 25 relative to the output member 34. The arms 35 extend radially outwardly from the periphery of the disc-shaped central portion of the output member 34. When the power transmitting apparatus 1 is idle, the radially outwardly extending arms 35 of the output member 34 are located exactly or substantially midway between the aforementioned stops and pockets of the carrier portion 22 and the input member 25. In other words, each arm 35 is then aligned with a stop of the input member 25 and with a stop of the carrier portion 22, as seen in the direction of the axis X—X.

When unstressed, the springs 20, 21 can be somewhat shorter than the distance of successive arms 35 from one another (as seen in the circumferential direction of the housing 2). This ensures that the input member 25 can turn relative to the output member 34 through a certain angle from a starting position (in which each arm 35 is aligned with the neighboring stops of the parts 25 and 22) without causing any stressing (or additional stressing) of the springs 20, 21. In other words, the springs 20, 21 can be installed with a certain amount of angular play which exists when the apparatus 1 is idle so that the arms 35 are located between the neighboring stops on the input member 25 and the portion 22 of the carrier 23.

The radially inner portion of the output member 34 is connected with a radially outwardly extending flange 14a of the hub 14 by one or more rivets 36 or other suitable fasteners. The illustrated discrete rivets 36 can be omitted if the flange 14a of the hub 14 and/or the radially inner portion of the output member 34 is designed to non-rotatably engage the-adjacent part 14a or 34 in a different way, e.g., by employing rivets (replacing the rivets 36) which are of one piece with the portion 14a and/or member 34.

The hub 14 includes a radially extending surface 14b which confronts the inner side of the wall 12 forming part of the housing section 5. An axial stop 37 is installed between the wall 12 and the surface 14b to serve as a means for limiting the extent of movability of the hub 14 (and of all parts which share the axial movements of the hub) in a direction toward the inner side of the wall 12. The illustrated axial stop 37 resembles or constitutes a ring which is provided with projections or lugs 38 extending in parallelism with the axis X—X and into complementary recesses or sockets of the hub 14. The lugs 38 can constitute integral portions of the stop 37 which are bent out of the adjacent main portion of the stop so as to extend at least close to directions parallel to the axis X—X. The lugs 38 of the axial stop 37 and the complementary sockets of the hub 14 ensure that the stop 37 cannot turn relative to the hub.

In order to reduce friction between the axial stop 37 and the parts which come into sliding contact therewith, the stop 37 can constitute a laminate having at least one outer layer with a low coefficient of friction. Alternatively, the entire axial stop 37 can be made of a suitable metallic sheet material such as bronze. It is also possible to utilize one or more friction reducing inserts which can be made of a plastic material and are produced independently of the hub 14 and/or axial stop 37. The material of such plastic insert or inserts is selected with a view to reduce friction between the axial stop 37 and the adjacent parts.

The internal space of the housing 2 can be filled with a pressurized fluid (such as oil) whose pressure should suffice to engage the bypass clutch 18 when necessary. The pressurized fluid which is admitted into the housing 2 acts upon that side of the plunger 27 (in the direction of the axis X—X) which confronts the runner 13, and such pressure is applied to urge the plunger 27 toward the wall 12. In order to disengage the bypass clutch 18, the chamber 30 between the wall 12 and the output component 27 of the bypass clutch 18 receives a pressurized fluid (e.g., oil) through a supply conduit 39. The admission of pressurized fluid into the chamber 30 via conduit 39 continues until the resulting force acting in the direction of the axis X—X reaches a value at which the plunger 27 is shifted axially in a direction toward the runner 13 to thus move its friction surface 31 axially of and away from the friction surface 32 on the wall 12. At such time, the friction lining 33 is no longer effective to transmit torque between the wall 12 (housing 2) and the plunger 27. Once the bypass clutch 18 is disengaged, the fluid which has been admitted into the chamber 30 can escape through the resulting clearance between the friction surfaces 31 and 32; such fluid enters the main portion of the space within the housing 2.

An advantage of a power or force transmitting apparatus wherein a lockup clutch or torque converter clutch can be operated to bypass the fluid coupling is that the torque which is generated by the prime mover (such as the engine of a motor vehicle) can be transmitted directly to a driven unit (such as a variable speed transmission in the motor vehicle), i.e., one can bypass the hydraulic part of the fluid coupling (such as a hydrodynamic torque converter) to thus eliminate losses which are attributable to unavoidable slippage in the fluid coupling. Bypass clutches for use in power transmitting apparatus of heretofore known design are invariably constructed, assembled and mounted in such a way that they become engaged only when the RPM of the output device of the prime mover is high. The energy requirements of a power transmitting apparatus increase proportionally with increasing slippage in the fluid coupling. The improved bypass clutch 18 is constructed and mounted in such a way that it can be engaged at a relatively low RPM of the housing 2, i.e., the clutch can become and remain engaged within a wide operating range of the apparatus 1 with attendant savings in energy. At the same time, and since the clutch 18 is connected in series with the damper 16, the comfort to occupants (especially that comfort which is attributable to the absence of vibrations) is not affected by the fact that the clutch 18 is engaged and/or that such clutch is or can be engaged within a wide range of operations of the apparatus 1. In presently known power transmitting apparatus, the just discussed comfort to the occupant or occupants of a vehicle wherein the power train between the engine and one or more wheels contains power transmitting apparatus is attributable primarily to the presence of the fluid coupling and to the fact that the bypass clutch of such conventional apparatus is engaged only at a high RPM of the crankshaft of the engine. In order to achieve the required or desired comfort, the natural mode of vibration of that part of the power train which embraces all elements from the input of the transmission to the differential of a motor vehicle must be moved into a range which is not affected during normal operation of the vehicle. This is accomplished in that the energy storing elements 20, 21 of the damper 16 are spaced apart from the axis X—X in the radial direction of the housing 2 and that such energy storing elements are located in the power flow between the runner 13 and the output element (such as the hub 14) of the apparatus 1. The feature that the energy storing elements 20, 21 are remote from the axis X—X renders it possible to incorporate a maximum of spring capacity or spring volume. Such incorporation of a maximum spring capacity, in turn, renders it possible to lower the resonance RPM by lowering the spring gradient which, in turn, renders it possible to achieve large angular displacements between the housing 2 and the hub 14, i.e., the springs 20, 21 can undergo very substantial compression while the housing 2 turns relative to the hub 14 and/or vice versa.

The feature that at least the springs 20, 21 of the damper 16 are installed between the runner 13 and the wall 12 of the main housing section 5 contributes to compactness of the damper as well as to compactness of the entire apparatus. Furthermore, and especially as concerns the effect upon the resonance RPM or resonance speed, it is advisable to design the improved apparatus in such a way that the spring rate or gradient of the damper 16 is between 2 and 20 Nm/°, preferably between 5 and 15 Nm/°.

The aforediscussed wear reducing means (such as the wear reducing means 145 in the apparatus 101 of FIGS. 2 and 3) constitutes an optional but desirable and advantageous feature of the improved apparatus because it contributes to longer useful life of the springs 20, to longer useful life of the housing 2 and to longer useful life of the entire apparatus 1. It often suffices if the wear reducing means is adjacent only to the radially outer or outermost portions of the springs 20.

The trough-shaped abutment 22 which is shown in FIG. 1 preferably closely conforms at least to the radially outer portions of the springs 20 and is non-rotatably connected with the runner 13 (by fasteners 17) radially inwardly of such springs. However, and as will be described with reference to the apparatus 101 of FIGS. 2 and 3, it is often advantageous and desirable to establish a non-rotatable connection between the runner (113) and the part (122) which surrounds the radially outer portions of the springs (120) at a location close to the radially outermost part of the runner (113).

Irrespective of the exact design of the improved apparatus, it is normally desirable to provide for the springs (such as 20, 21) an output member (34) which is at least indirectly non-rotatably connected with the output element (such as the hub 14) of the apparatus.

If the apparatus 1 is equipped with a lockup clutch or torque converter clutch 18 or with an analogous clutch serving to bypass the fluid coupling 3, it is desirable that the output component (such as the piston or plunger 27) of the clutch be mounted with freedom of axial movement and that it be non-rotatably connected to the input member (such as 25) of the at least one damper (16) of the torsionally elastic damper means. Such output component is or can be mounted for axial movement relative to the input member of the at least one damper. The placing of the friction lining 33 at a radial distance from the axis X—X which equals or approximates the radial distance of the damper 16 from such axis also contributes to compactness and superior operation of the damper, of the bypass clutch and of the entire apparatus. The same holds true for the feature that the plunger (output element) 27 of the clutch 18 is disposed between the wall 12 and the damper 16 (as seen in the direction of the axis X—X). The utilization of an output component in the form of a piston or plunger 27, which is movable in the direction of as well as about the axis X—X but is sealingly mounted on the output element 14 of the apparatus 1, also constitutes a novel and desirable feature of the improved combination of damper 16, clutch 18 and fluid coupling 3. The utilization of a form-locking connection between the piston or plunger 27 (output component of the clutch 18) and the input member 25 of the damper 16 also contributes to compactness and other desirable characteristics of such combination. In the apparatus 1 of FIG. 1, such form-locking connection is established by the aforediscussed substantially radially extending teeth between the plunger 27 and the input member 26. As already explained hereinbefore, such toothed form-locking connection can be replaced with a connection which employs leaf springs and enables the piston or plunger 27 to move axially of the radial wall 12 of the main housing section 5.

The springs 20, 21 of the damper 16 should be installed radially outwardly of the center of the impeller 10.

FIGS. 2 and 3 illustrate certain parts of the modified power transmitting apparatus 101. All such parts of the apparatus 101 which are identical with or clearly analogous to corresponding parts of the apparatus 1 of FIG. 1 are denoted by similar reference characters plus 100. In several respects, the construction and mode of operation of the apparatus 101 are at least substantially identical with those of the apparatus 1. The important differences between the two apparatus are pointed out below.

The power transmitting apparatus 101 of FIGS. 2 and 3 also comprises a fluid coupling 103 which is installed in the rotary housing 102 adjacent the radially extending wall 112 of the housing section 105. The fluid coupling 103 comprises an impeller 110 and a runner 113 between the impeller and the wall 112. The runner 113 is rotatably and axially movably mounted on an intermediate part or insert 140, and the latter is mounted on the hub 114 with the interposition of a suitable seal 141. The hub 114 has internal splines extending into the external grooves of the shaft (not shown in FIGS. 2 and 3) of the input device to thus ensure that the shaft and the hub 114 are compelled to share all angular movements about the axis of the housing 102. The insert 140 can be made from a suitable plastic material; however, it is equally possible to make this insert from a metallic material (such as aluminum).

The internal space which is defined by the sections 105, 106 of the housing 102 receives the torsionally elastic damper 116 which is installed to operate between the hub 114 and a torque transmitting part which is welded or otherwise secured to the runner 113. The damper 116 is connected in series with a bypass clutch 118.

The energy storing elements (arcuate coil springs) 120 of the power transmitting means 119 of the damper 116 have radially outer portions which are adjacent the abutment 122 of the carrier 123. The latter serves to stress the springs 120 and has a substantially L-shaped cross-sectional outline. A welded seam 142 (which can be replaced by a plurality of spot welds) is provided to establish a rigid connection between the radially outer portion of the runner 113 and the carrier 123.

The radially inwardly extending leg 143 of the carrier 123 is immediately or closely adjacent the wall 112 of the housing section 105 and is provided with a friction surface 131 forming part of the bypass clutch 118. The friction surface 131 confronts a friction surface 132 of the wall 112, and one of these friction surfaces is preferably connected with a friction lining 133 corresponding to the friction lining 33 in the bypass clutch 18 of the apparatus 1. That portion of the radially inwardly extending leg 143 of the carrier 123 which extends radially inwardly beyond the friction surface 131 is connected to the member 125 by rivets 144. The member 125 is provided with arms which can engage the adjacent end convolutions of the coil springs 120 in response to angular displacement of the wall 112 and hub 114 relative to each other. As can be seen in FIG. 2, the member 125 has a substantially U-shaped cross-sectional outline with two spaced apart legs 125*a*, 125*b* connected to each other by a web. The leg 125*a* of the member 125 extends radially inwardly beyond the other leg 125*b* and is secured to the carrier 123 by the aforementioned rivets 144. As can be seen in FIG. 3, that part of the member 125 which is located at the rivets 144 (as seen in the direction of the axis of the housing 102) is much larger (as seen in the circumferential direction of the housing) than the part which includes the arms 125*c* extending between the coil springs 120. The legs 125*a*, 125*b* of the member 125 extend radially of the housing 102 all the way from the radially innermost portions to the radially outermost portions of the coil springs 120 constituting the power transmitting means 119 of the damper 116. The aforementioned web of the member 125 connects the legs 125*a*, 125*b* to each other radially outwardly of the coil springs 120; such web extends substantially in the direction of the axis of the housing 102.

The aforementioned wear reducing means 145 of the apparatus 101 can comprise one or more substantially trough-shaped parts which are outwardly adjacent the radially outer portions of the coil springs 120 and are engaged by such springs at least when the springs are acted upon by centrifugal force, i.e., when the output device of an engine drives the housing 102. The wear reducing means 145 is radially inwardly adjacent and can bear against the radially outer portion 122 of the carrier 123. The illustrated wear reducing means 145 includes several arcuate portions each of which extends circumferentially of the housing 102 between two neighboring radially outer portions 125*a* of the member 125. Each portion of the wear reducing means 145 can be anchored in the member 125; for example, each such portion of the wear reducing means can include one or more protuberances extending into recesses or sockets provided therefor in the leg 125*a* and/or 125*b* of the member 125. Alternatively, portions of the wear reducing means 145 can be anchored in the aforementioned web which forms part of the member 125 and connects the legs 125*a*, 125*b* to each other radially outwardly of the coil springs 120. The arrangement is preferably such that each portion of the wear reducing means 145 is secured to the member 125 against any (or against appreciable) movement in the direction of the axis of the housing 102 as well as against movement in the circumferential direction of the housing.

If desired or necessary, at least the legs 125*a*, 125*b* of the member 125 can be hardened in any suitable way not forming part of the present invention; this further reduces the likelihood of any wear (or extensive wear) upon the member 125 as a result of contact with the coil springs 120.

The output member 134 of the damper 116 constitutes or resembles a flange having a radially outer portion provided with radially extending arms 135 serving to engage the adjacent coil springs 120 (see particularly FIG. 3). When the apparatus 101 is idle, the arms 135 are or can be located between the legs 125*a*, 125*b* of the member 125, i.e., it can be said that the arms 135 are then confined between the legs 125*a*, 125*b*. In a manner analogous to that already explained with reference to the apparatus 1 of FIG. 1, the mounting of the coil springs 120 in the apparatus 101 of FIGS. 2 and 3 can be such that the springs 120 are caused to begin to store energy, or to store additional energy, after the input and output devices (i.e., the wall 112 and the hub 114) complete a certain initial angular movement relative to one another.

The radially inner portion of the output member 134 of the damper 116 is rigidly connected to the hub 114, e.g., by a welded seam 114D. An axial stop 137 is installed radially outwardly of the welded seam 114D and is interposed between a radially extending portion of the output member 134 and the wall 112. This axial stop is provided with axially parallel projections 138 (e.g., in the form of lugs) which extend into complementary sockets or recesses of the ouput member 134 to thus ensure that the parts 134 and 137 cannot turn relative to each other.

When the bypass clutch 118 is engaged, the chamber 130 between the wall 112 of the housing section 105, the insert 140 and the runner 113 is sealed. The radially inner portion of the chamber 130 is then sealed by the seal 141 between the insert 140 and the hub 114, and a median portion of the chamber 130 is sealed by a further seal 146 which is installed between the insert 140 and the runner 113 (the latter is centered on the insert 140). The radially outer portion of the chamber 130 is sealed as a result of engagement of the friction surfaces 131, 132 with one another (with the friction lining 133 between them), i.e., as a result of sealing engagement between the leg 143 of the member 123 and the wall 112 of the housing section 105. Each of the seals 141 and 146 can include one or more O-rings.

The bypass clutch 118 can be sealed by pressurized fluid (such as oil) which is confined in the fluid coupling 103 between the impeller 110, runner 113 and the guide wheel 115. The fluid acts upon that side of the runner 113 which confronts the impeller 110 to exert upon the wall 112 a force acting in the direction of the axis of the housing 102. In order to disengage (open) the bypass clutch 118, a supply channel (corresponding to the channel 39 in FIG. 1 or another suitable channel) is caused to admit a pressurized fluid into the chamber 130. The pressure of admitted fluid must suffice to generate a force acting in the direction of the axis of the housing 102 and serving to move the runner 113 (and the members 123, 125 which share its movements) as well as the coil springs 120 and the wear reducing means 145 toward the impeller 110 so that the friction surfaces 131, 132 become separated from each other, i.e., the wall 112 and the leg 143 of the member 123 move apart. This establishes a path for the flow of fluid from the chamber 130 through the resulting clearance between the friction surfaces 131 and 132. It will be seen that at least a portion of the runner 113 in the fluid coupling 103 of the apparatus 101 acts not unlike a piston or plunger.

The utilization of an intermediate part or insert 140 which is made (at least in part) of a plastic material contributes to a reduction of weight as well as to lower cost of the entire apparatus. The part 140 performs several desirable functions including mounting the runner on the hub 114 and limiting the movements of the runner 113 in at least one of the two directions indicated by the axis of the housing 102.

The utilization of a carrier 123 having a substantially L-shaped cross-sectional outline also contributes to compactness of the apparatus 101. The axially parallel tubular or cylindrical portion 122 of this carrier is affixed to the runner 113, as at 142, and the carrier 123 performs the additional function of constituting the output component of the bypass clutch 118. The friction lining 133 is provided on the radially inwardly extending leg 143 of the carrier 123 or on the adjacent portion of the radially inwardly extending wall 112.

The power transmitting apparatus 201 of FIG. 4 constitutes a modification of the apparatus 101. All such parts of the apparatus 201 which are identical with or clearly analogous to corresponding parts of the apparatus 101 are denoted by similar reference characters plus 100.

The apparatus 201 comprises the rotary housing 202 for a fluid coupling 203 here shown as a hydrodynamic torque converter. The housing 202 can be connected to and can receive torque from the output device (e.g., a crankshaft) of an engine in a motor vehicle. The torque transmitting connection between the housing 202 and the output device is established by a plate-like intermediate part 247 (e.g., a piece of sheet metal). The radially inner (central) portion of the intermediate part 247 is or can be connected to the output device of the engine, and the radially outer portion of the part 247 is or can be affixed to the radial wall 212 of the housing section 205. The means for securing the radially outer portion of the intermediate part 247 to the wall 212 includes a set of threaded fasteners 204. The part 247 further serves as a carrier of a customary starter gear 248 which can be welded thereto radially outwardly of the fasteners 204.

The radially outermost portions of the two main sections 205, 206 of the housing 202 are fixedly connected to each other by a welded seam 207. The latter further constitutes a seal which prevents the escape of fluid from the radially outermost portion of the space within the housing 202. The impeller 210 of the fluid coupling 203 is an integral part of (and is preferably of one piece with) the section 206 of the housing 202, the same as in the fluid coupling 3 of FIG. 1. The runner 213 of the fluid coupling 203 is installed between the radially extending wall 212 of the housing section 205 and the impeller 210, and this runner is rotatable on a hub 214 which latter can be non-rotatably slipped onto the input shaft of a variable speed transmission and can be said to form part of the input device of the unit serving to receive torque from the output device including the crankshaft of the engine. The fluid coupling 203 of FIG. 4 further comprises a guide wheel 215 which is disposed between the radially inner portions of the impeller 210 and runner 113, as seen in the axial direction of the housing 202.

A torsionally elastic damper means 249 is confined in the space which is surrounded by the sections 205, 206 of the housing 202. This damper means establishes a yieldable connection between the hub 214 and a driving part; in the apparatus 201 of FIG. 4, the driving part is constituted by at least one portion of the housing 202. The illustrated damper means 249 comprises two stages or dampers, namely a radially inner stage or damper 216 and a radially outer stage or damper 250. The latter is adjacent the welded seam 207, i.e., it is installed in or close to the radially outermost portion of the space within the sections 205, 206 of the housing 202. The bypass clutch 218 of the power transmitting apparatus 201 is disposed between and is connected in series with the discrete dampers or stages 216, 250 of the torsionally elastic damper means 249.

The radially outer damper 250 is a torsionally elastic damper and comprises two energy storing elements 251 in the form of coil springs each of which can extend at least close to an arc of approximately 180°, i.e., circumferentially of the housing 202 along approximately one-half of the tubular (axially parallel) portion 222 of the section 205. Alternatively, the damper 249 can comprise four coil springs in a distribution as shown in FIG. 3, i.e., each extending along an arc of close to 90°. The selected circumferential length of the energy storing elements 251 will depend on one or more selected parameters, for example, upon the required volume of resilient material and/or the required spring gradient or spring rate and/or the overall number of energy storing elements and/or the relationship of such energy storing elements to one another (series connection or connection in parallel). Furthermore, and as already explained with reference to the coil springs 20, 21 in the power transmitting means 19 of the damper 16 shown in FIG. 1, it is often desirable and advantageous to impart to the coil springs 251 a desired arcuate shape prior to insertion into the housing 202, i.e., to ensure that the radii of curvature of the coil springs 251 need not be changed at all (or must be changed only negligibly) for the purposes of installing them in the space within the housing sections 205 and 206.

The coil springs 251 tend to move radially outwardly toward the tubular radially outermost portion 222 of the section 205, at least when the engine drives the housing 202, i.e., at least when the coil springs 251 are acted upon by centrifugal force. The tubular portion 222 which is radially outwardly adjacent the coil springs 251 and forms part of the housing section 205 extends in the direction of the axis of the housing 202 all the way from the radially inwardly extending wall 212 to the welded seam 207. The coil springs 251 cannot move into direct frictional engagement with the tubular portion 222 of the section 205 because the apparatus 201 comprises the aforementioned wear reducing means 245 in the form of one or more substantially trough-shaped inserts having a cross-sectional outline preferably at least slightly conforming to the outlines of adjacent radially outer portions of the coil springs 251. The wear reducing means 245 can be affixed to the portion 222 of the section 205 so that its angular and axial positions relative to the housing 202 remain unchanged when the apparatus 201 is idle or in use.

The means for stressing the coil springs 251 of the outer damper 250 comprises arms 252 which are or can be of one piece with the section 205 of the housing 202 and cause the coil springs 251 to store energy (or to store additional energy) when the housing 202 is caused to turn relative to the hub 214. The section 205 consists (or can consist) of metallic sheet material, and the arms 252 can be obtained by providing the outer side of the wall 212 of the section 205 with depression in the form of pockets in a manner as described in the aforementioned commonly owned U.S. Pat. No. 5,150,777 to Friedmann. The arms 252 can be designed in such a way that they extend between neighboring pairs of coil springs 251 in the axial as well as in the radial direction of the housing 202.

Additional arms 253 constituting stressing or deforming means for the coil springs 251 are provided at those sides of the springs 251 which face away from the radially inwardly extending wall 212 of the section 205. The arms 253 can constitute separately produced parts which are reliably affixed to the portion 222 of the section 205. Alternatively, the arms 253 can be obtained by providing pockets in an annular component 254 which is inwardly adjacent the tubular or cylindrical portion 222 of the section 205. Each arm 253 extends between the two neighboring coil springs 251 in the axial and radial directions of the housing 202, and each arm 253 confronts one of the arms 252 as seen in parallelism with the axis of the housing 202. The illustrated component 254 has a substantially L-shaped or V-shaped cross-sectional outline with a radially inwardly extending leg and a second leg extending in parallelism with the axis of the housing 202. The arms 253 are provided in the radially inwardly extending leg of the component 254, i.e., that side of the component 254 which faces away from the wall 212 is provided with pockets which cause the development of arms 253 extending between the end convolutions of neighboring coil springs 251. The other leg of the component 254 constitutes a relatively short sleeve having an outer diameter which matches or approximates the inner diameter of the tubular portion 222 of the housing section 205. A rigid connection between the axially extending leg of the component 254 and the portion 222 of the section 205 can comprise one or more welded seams or the like.

The arms 252, 253 which extend between pairs of neighboring coil springs 251 can further serve to prevent rotation of the wear reducing means 245 in the housing 202. For example, the wear reducing means 245 can comprise a plurality of arcuate portions, and each such portion can extend circumferentially of the housing 202 between a first pair of aligned arms 252, 253 and a second pair of aligned arms 252, 253.

The output member of the radially outer damper 250 is constituted by a ring-shaped part 255 which is provided with radially outwardly extending projections or arms 256. When the apparatus 201 is idle, each projection 256 is disposed between an arm 252 and an arm 253, as seen in parallelism with the axis of the housing 202. Again, it is possible to select the dimensions of the coil springs 251 (as seen in the circumferential direction of the housing 202) and/or the dimensions of the arms 252, 253 and/or the dimensions of the projections 256 in such a way that the housing 202 and the hub 214 can turn relative to each other through a certain angle before the springs 251 begin to store energy or before such springs begin to store additional energy.

The output member 255 of the damper 250 comprises a portion which is disposed radially inwardly of the projections 256 and constitutes the input component of the bypass clutch 218. To this end, the radially inner portion of the output member 255 is provided with two friction surfaces one of which faces toward and the other of which faces away from the wall 212 (as seen in the axial direction of the housing 202). One friction surface of the input component of the bypass clutch 218 can be engaged by the friction surface 231 on the axially movable piston or plunger 227 of the clutch 218. The other friction surface of the input component of the clutch 218 (i.e., of the output member 255 of the damper 250) can be caused to come into engagement with a friction surface 257 on the carrier 223. The latter is affixed to the runner 213 of the fluid coupling 203. One or more friction linings 233 can be used between the friction surfaces 231 and 257.

The radially outer part of the carrier 223 is rigidly connected to the runner 213 by a welded seam 258. A radially inwardly extending flange 259 of the carrier 223 is secured to and is disposed between two discs or sidewalls 261, 262. The connection includes a set of rivets 260 and is designed to hold the parts 259, 261, 262 against axial as well as against angular movements relative to each other. The sidewalls 261, 262 are provided with windows for portions of arcuate coil springs 220 forming part of the power transmitting means 219 in the radially inner damper 216. The sidewalls 261, 262 together constitute the input member of the damper 216. The surfaces bounding the windows in the sidewalls 261, 262 act not unlike biasing means which cause the springs 220 to store energy (or to store additional energy) when the input member 261, 262 of the damper 216 is caused to turn relative to the output member of this damper (or vice versa).

One or more rivets 263 are provided to connect the sidewall 262 and the piston or plunger 227 of the bypass clutch 218 to each other in such a way that the parts 262, 227 cannot turn but are free to move relative to each other in the direction of the axis of the housing 202.

The coil springs 220 of the radially inner damper 216 are or can be engaged and stressed by the arms 235 of the part 234 of the composite output member 234, 261, 262 of the damper 216. The radially inner portion of the output member part 234 of the damper 216 is affixed to the hub 214 so that the parts 214, 234 are held against angular as well as against axial movement relative to each other. The radially outer portion of the part of the output member 234 has a centering surface 264 for the output member 255 of the radially outer damper 250, i.e., the surface 264 prevents any wobbling of the output member 255 in the radial direction of the housing 202. The output member 255 has freedom of movement in the axial direction of the centering surface 264.

The piston or plunger 227 of the bypass clutch 218 includes a radially inner portion having a sleeve 265 which is turnably and axially movably mounted on an intermediate part 266. The latter serves to center the plunger 227 as well as an axial stop for the hub 214, i.e., to limit the movements of the hub 214 in one of two directions axially of the housing 202. The intermediate part 266 can be made of a suitable plastic material or of a suitable metallic material (such as aluminum) and includes an axially extending cylindrical centering portion 267 for the plunger 227. The centering portion 267 further carries a seal 268 which is engaged by the sleeve 265.

A portion of the output element or hub 214 which is remote from the sleeve 265 is connected with the runner 213 by a member 269 having a substantially L-shaped cross-sectional outline. The arrangement is such that the runner 213 can rotate relative to the hub 214. A seal 270 is installed between the member 269 and an axial extension of the hub 214. The seal 268 and/or 270 can include one or more O-rings.

The radially outer damper 250 of the composite damper means including the dampers 216 and 250 is installed to operate between the drive (plate 247 and housing 202) and the runner 213. The bypass clutch 218 is installed in series between the damper 250 and the runner 213 of the fluid coupling 203. The other (radially inner) damper 216 operates between the runner 213 and the output element including the hub 214, i.e., in the same way as in the apparatus 1 or 101. However, it is equally within the purview of the invention to install the damper which operates between the runner 213 and the hub 214 radially outwardly of the other damper (which operates between the drive means and the runner 213). Otherwise stated, the damper which performs the function of the damper 250 in the apparatus 201 of FIG. 4 can be disposed radially inwardly of the other damper (corresponding to the damper 216 of the apparatus 201). The bypass clutch 218 can be installed in series with one damper or with each damper in damper means employing a plurality of dampers (such as the dampers 216 and 250 in the apparatus 201 of FIG. 4).

The bypass clutch 218 is engaged in response to a rise of pressure of fluid which is confined in the housing 202; such pressure must suffice to shift the plunger 227 of the clutch 218 axially in a direction toward the runner 213. In order to disengage the clutch 218, it is necessary to introduce a pressurized fluid through the channel 239 and into the chamber 230 so as to move the plunger 227 in a direction toward the wall 212; this moves the friction surface 231 of the plunger 227 axially of the housing 202 and away from the friction surface 257 of the carrier 223 and enables the output member 255 to move axially and away from the input member 257 so that the friction surfaces are separated from one another, i.e., the friction lining or linings 233 become ineffective. When the clutch 218 is disengaged, the fluid which was confined in the chamber 230 can escape between the friction surfaces of the plunger 227, the carrier 223 and the flange 255, i.e., the pressure in the chamber 230 decreases.

The power or force transmitting apparatus 201 of FIG. 4 also exhibits a number of important and unobvious advantages. As already described above, the energy storing elements 220 of the damper 216 are installed in the power flow between the runner 213 and the hub 114, and the energy storing elements 251 of the damper 250 are installed in the power flow between the housing 202 and the runner 213. In the apparatus 201 of FIG. 4, the energy storing elements 251 are installed radially outwardly of the energy storing elements 220; however, it is possible to modify the apparatus 201 so that the energy storing elements 220 are located at the same radial distance from the axis of the housing 202 as, or at a greater radial distance, than the energy storing elements 251.

The positioning of at least one of the friction surfaces 231, 232 of the bypass clutch 218 between the energy storing elements 220 of the radially inner damper 216 and the energy storing elements 251 of the radially outer clutch 250 also contributes to compactness of the apparatus 201. The clutch 218 connects the output member 255 of the damper 250 with the composite input member 223, 262 of the damper 216.

The carrier 223 (part of the input member of the damper 216) can form part of the runner 213, and the input member 252 of the damper 250 can form part of the housing 202. This not only reduces the cost of the apparatus 201 but also contributes to its simplicity and convenience of assembly or dismantling. If the positions of the dampers 216, 250 depart from those shown in FIG. 4, the input member of the damper 250 can form part of the runner 213 and the input member of the damper 216 can form part of the housing 202.

The feature that the output member 234 of the damper 216 is non-rotatably connected with the output element 214 also contributes to novelty, simplicity and compactness of the apparatus 201. The same holds true for the feature that the runner 213 is centered by the output element 214 and that the substantially disc-shaped piston or plunger 227 of the bypass clutch 218 is centered by the output element 214. In accordance with a feature of the invention, such centering is effected by the intermediate member 266 having the portion 267 with seal 268 between the hub 214 and the sleeve-like radially inner portion 265 of the plunger (output component) 227 of the clutch 218. The compactness of the apparatus 201 is further enhanced by the fact that the output member 255 of the damper 250 is centered by the part 234 of the output member of the damper 216 in such a way that it is held against radial stray movements but can move in the directions of the axis of the housing 202. Compactness of the apparatus 201 is also enhanced by the feature that the input member 262 of the damper 216 is non-rotatably connected (at 263) with the piston or plunger 227 of the bypass clutch 218. The parts 266 and 227 can be non-rotatably connected to each other; however, it is also possible to replace the connection (rivets 263) with a connection which establishes a certain amount of play between the parts 227 and 266.

The improved power transmitting apparatus is susceptible of numerous additional modifications. For example, certain features of the apparatus 1 can be combined with those of the apparatus 101 and/or 201, and certain features of the apparatus 101 can be combined with those of the apparatus 201. Furthermore, certain features of the apparatus 1, 101 and/or 201 can be used to develop novel and improved patentable modifications of heretofore known power transmitting apparatus. Still further, certain features of the apparatus 1, 101 and/or 201 are believed to be sufficiently novel and unobvious to warrant independent patent protection.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Power transmitting apparatus comprising a fluid coupling including at least one housing having an axis of rotation and connectable with a rotary driving device, at least one impeller disposed in and driven by said at least one housing when said at least one housing is connected with and rotated by said driving device, and at least one runner disposed in said at least one housing and connectable with a rotary driven device; an output element; at least one torsionally elastic damper in a power train between said at least one housing and said output element, said at least one damper including at least one energy storing element acting in a circumferential direction of said at least one housing, said at least one energy storing element being disposed radially outwardly of said axis between said at least one runner and said output element; and means for stressing said at least one damper, said stressing means being connected with said runner for joint movement about and along said axis and said runner being movable relative to said output element in the direction of said axis.

2. The apparatus of claim 1, wherein said fluid coupling further comprises at least one guide wheel between said at least one impeller and said at least one runner.

3. The apparatus of claim 1, further comprising means for at least indirectly mounting said stressing means on said output element.

4. The apparatus of claim 3, wherein said means for at least indirectly mounting comprises an intermediate member surrounding at least a portion of a hub of said output element.

5. The apparatus of claim 4, wherein said intermediate member includes means for limiting the extent of movability of said at least one runner in at least one direction axially of said at least one housing.

6. The apparatus of claim 3, wherein said means for indirectly mounting contains a plastic material.

7. The apparatus of claim 1, further comprising a carrier connecting said stressing means with said at least one runner, said carrier having a substantially L-shaped cross-sectional outline and overlying said stressing means in the direction of said axis.

8. The apparatus of claim 7, further comprising means for securing said carrier to said at least one runner.

9. The apparatus of claim 8, wherein said securing means comprises a welded joint.

10. The apparatus of claim 7, wherein said carrier constitutes an output component of a bypass clutch.

11. The apparatus of claim 10, wherein said clutch is in series with said at least one damper.

12. The apparatus of claim 7, wherein said carrier is provided with at least one friction lining.

13. A hydrodynamic torque converter comprising a housing connectable with a drive shaft for rotation about a predetermined axis; at least one impeller installed in and driven by said housing when said housing is connected with and rotated by said drive shaft; a rotor disposed in said housing and connectable with a driven shaft; an engageable and disengageable bypass clutch provided in said housing; and a torsionally elastic damper disposed in said housing in series with said clutch and including energy storing springs, said clutch comprising a substantially disc-shaped piston including a friction surface and having limited freedom of movement relative to said rotor in the direction of said axis from and into engagement with said housing for transmission of torque from the housing when the housing is connected with and rotated by said drive shaft, to an output element which is connectable with said driven shaft, said output element comprising a first substantially disc-shaped component arranged to cause said springs to store energy and said damper further comprising a second substantially disc-shaped component arranged to cause said springs to store energy and to establish a torque-transmitting connection with said first component by way of said springs, said first and second components being rotatable relative to each other against the resistance of said springs and the second component being non-rotatably connected with said rotor and said piston, said springs being operative to transmit torque between said rotor and said driven shaft in the disengaged condition of said clutch.

14. Power transmitting apparatus comprising a fluid coupling including at least one housing having an axis of rotation and connectable with a rotary driving device, at least one impeller disposed in and driven by said at least one housing when said housing is driven by said driving device, and at least one runner disposed in said at least one housing and connectable with a rotary driven device; damper means including at least one torsionally elastic damper including means for transmitting power between said at least one housing and said driven device, said power transmitting means comprising at least one energy storing element acting in a circumferential direction of said at least one impeller in a power flow between said at least one runner and said driven device and being spaced apart from and disposed radially outwardly of said axis; and a bypass clutch in series with said at least one damper.

15. The apparatus of claim 14, wherein said bypass clutch includes an output component non-rotatably connected with an input member of said at least one damper.

16. The apparatus of claim 15, wherein said output component is movable in the direction of said axis.

17. Power transmitting apparatus comprising a fluid coupling including at least one housing having an axis of rotation and connectable with a rotary driving device, at least one impeller disposed in and driven by said at least one housing when said housing is driven by said driving device, and at least one runner disposed in said at least one housing and connectable with a rotary driven device; damper means including at least one torsionally elastic damper including means for transmitting power between said at least one housing and said driven device, said power transmitting means comprising at least one energy storing element acting in a circumferential direction of said at least one impeller in a power flow between said at least one runner and said driven device and being spaced apart from and disposed radially outwardly of said axis; and a bypass clutch in series with said damper means, said bypass clutch having a friction surface disposed at a first radial distance from said axis and said damper means being disposed at a second radial distance from said axis, said second distance at least approximating said first distance.

18. Power transmitting apparatus comprising a fluid coupling including at least one housing having an axis of rotation and connectable with a rotary driving device, at least one impeller disposed in and driven by said at least one housing when said housing is driven by said driving device, and at least one runner disposed in said at least one housing and connectable with a rotary driven device; damper means including at least one torsionally elastic damper including means for transmitting power between said at least one housing and said driven device, said power transmitting means comprising at least one energy storing element acting in a circumferential direction of said at least one impeller in a power flow between said at least one runner and said driven device and being spaced apart from and disposed radially outwardly of said axis; and a bypass clutch in series with said damper means, said clutch having an output component disposed between said at least one damper and a wall of said at least one housing, as seen in the direction of said axis, said wall being adjacent said driving device.

* * * * *